Nov. 20, 1962    L. J. O'BRIEN ETAL    3,064,479
DEVICE TO MEASURE PRESSURE CHANGES AT
HIGH ABSOLUTE PRESSURES
Filed May 15, 1959    2 Sheets-Sheet 1

INVENTORS
LEO J. O'BRIEN
BY  RONALD R. PROCTOR

Edward P. Lang

ATTORNEY

INVENTORS
LEO J. O'BRIEN
BY RONALD R. PROCTOR

ATTORNEY

United States Patent Office 3,064,479
Patented Nov. 20, 1962

3,064,479
DEVICE TO MEASURE PRESSURE CHANGES AT HIGH ABSOLUTE PRESSURES
Leo J. O'Brien and Ronald R. Proctor, Crystal Lake, Ill., assignors to The Pure Oil Company, Chicago, Ill., a corporation of Ohio
Filed May 15, 1959, Ser. No. 813,538
1 Claim. (Cl. 73—407)

This invention relates to a device for measuring relatively small changes in pressure under conditions of high absolute pressures. More particularly, the invention relates to a differential pressure recorder, including means for obtaining a mechanical movement proportional to small fluctuations in pressure under conditions of high absolute pressures in an oil well, and for recording such mechanical movement.

In determining the characteristics of subterranean oil-bearing formations, and in assessing the potential value of these formations as sources of petroleum, it is frequently desirable to obtain accurate information regarding pressure changes relative to time at the bottom of a borehole, or at any point along its length. Such pressure-time measurements and values permit calculations of the effective permeabilities of formations, permit determinations of extrapolated initial reservoir pressures, allow evaluations of the skin effect or well-bore damage caused by the drilling or completion methods, and lastly, allow determinations to estimate reservoir size. The methods of obtaining information for the calculation of permeability, initial reservoir pressure and skin effect or well damage, and the calculation techniques used, are presented in a paper by Van Everdingen in the Journal of Petroleum Technology-Petroleum Transactions, 198, 171 (1953). Procedures for determining the reservoir size are also known in the art.

The accuracies of the values calculated by these methods depend upon the accuracy of the determination of relatively small changes in bottom-hole pressures over relatively short periods of time. Heretofore, the best prior art method for determining such changes in pressure has relied on the use of devices for determining the absolute pressure in the well bore at specified intervals. The change in pressure is then determined by subtracting one absolute pressure from another. This procedure is subject to relatively large inaccuracies, especially at the high pressures encountered in most deep wells, pressures of the order of 5000 p.s.i. Inaccuracies also occur when these measurements are made in conjunction with formations having high permeabilities of the order of 1000 md. and higher. As a consequence, the results obtained heretofore have been of doubtful value.

It becomes, therefore, a primary object of this invention to provide a device whereby accurate determinations of changes in pressure at high absolute pressures can be made in a well bore.

Another object of this invention is to provide an improved apparatus for measuring the differential pressure in a well bore whereby a mechanical movement proportional to small pressure changes is obtained and automatically recorded.

Still another object of this invention is to provide independent means for measuring and recording static pressure, along with means for measuring differential pressure and recording same.

Another object of this invention is to provide a differential-pressure apparatus including, in combination, control valves, differential-pressure ports, differential pressure-measuring means, a motion amplifier, a recording chart, and means for driving same.

These and other objects of the invention will be explained or become obvious as the description of the invention proceeds.

The apparatus is more clearly illustrated by reference to the following detailed description of one or more preferred forms of the apparatus, throughout which description reference is made to the accompanying drawings in which.

Figure 1:
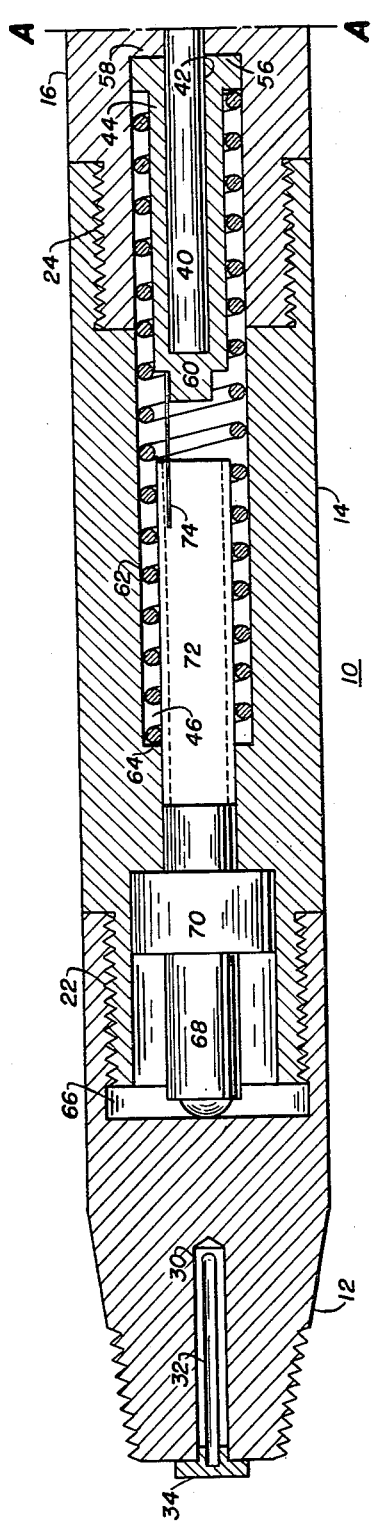
FIGURE 1 is a longitudinal cross-sectional view divided into two sections by match lines A—A of one form of the apparatus showing some of the parts diagrammatically.
Figure 1:
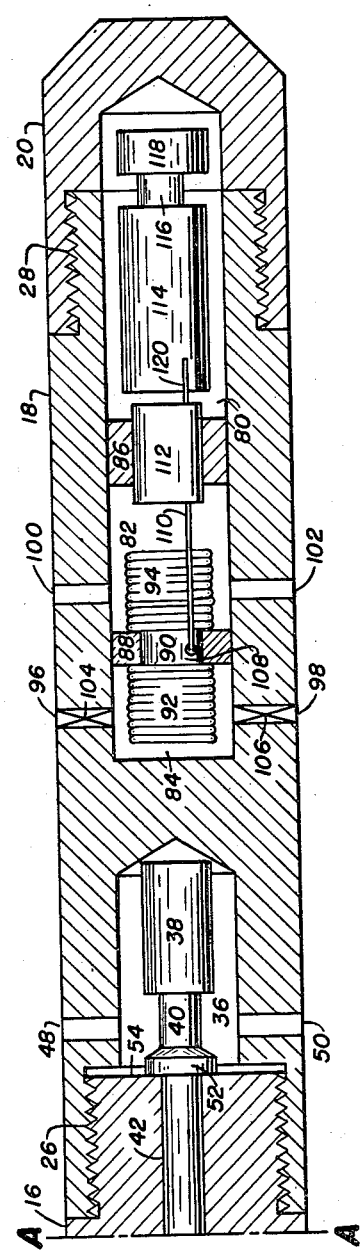

Referring to FIGURE 1, the number 10 relates to the entire body shell which is made up of top section 12, mid-sections 14 and 16, bottom section 18, and cap member 20. These members are held together by threaded engagement, as indicated at 22, 24, 26 and 28. Top section 12 is tapered and has a central elongated recess 30 into which is fitted thermometer 32 held in place by cap 34. Sections 12, 14, 16 and the top of section 18 fit together to form a housing for the static pressure recorder. Recess 36 in the top of body section 18 contains piston 38 connected to shaft 40 which extends through opening 42 into collar 44 contained within recess 46 of body section 16. Static pressure ports 48 and 50 extend through the wall of body section 18 into recess 36. Gasket 52 seals rod 40 against the end 54 of body unit 16. Collar 44 has shoulder 56 seated against shoulder 58 at the end of recess 46. Rod 40 seats against end 60 of collar 44. Spring 62 seats against shoulder 64 at one end and shoulder 56 at the other end, urging both collar 44 and rod 40 toward recess 36.

Recess 66 in body member 12 forms a housing for chart drive-motor 68 and gear-reduction unit 70 which actuates recording chart 72 operating within recess 46 and the upper end of spring 62. Stylus 74 attached to the bottom 60 of collar 44, is moved back and forth in accordance with the pressure within recess 36, and forms a graph on chart 72. The static pressure recorder shown is well-known in the art and forms no part of this invention.

Within body portion 18 and cap member 20, the component parts of the differential-pressure recorder of this invention are shown. Body portion 18 has three (3) recesses, 80, 82 and 84, formed by transverse walls 86 and 88. Transverse wall 88 supports differential-pressure unit 90 having bellows 92 and 94 located in recesses 84 and 82, respectively. Ports 96 and 98 extend through the wall of body 18 into recess 84. Similarly, ports 100 and 102 extend into recess 82. Ports 96 and 98 are equipped with remote-control valves 104 and 106. Bellows 92 and 94 are joined by cylinder 108 forming the housing for differential-pressure unit 90 mounted in sealed relationship within transverse wall or bulkhead 88. The bellows and connecting cylinders are filled with a suitable liquid, such as a mixture of $C_{10}$, $C_{11}$ and $C_{12}$ paraffins. Differential-pressure unit 90 is connected by means of rod 110, extending from torque tube housing 111 through an elbow bend, to motion amplifier 112 which is mounted in sealed relationship within transverse wall 86. Recording chart 114 is supported by shaft 116 driven by and connected to chart drive-motor 118. Stylus 120 is operably connected to the linear motion output of motion amplifier 112.

In operation, the pressure differentials sensed by bellows 94 cause differential-pressure unit 90 to impart a slight vertical (up-and-down) motion to shaft 110. This motion is transmitted to motion amplifier 112 and transposed into a proportional, amplified, linear motion in stylus 120, recording on chart 114.

The differential pressure-recorder 90 illustrated in FIGURE 1 may be any one of several known types. One such instrument is the Model 224 Differential Pressure Unit manufactured by the Barton Instrument Corp., Monterey Park, California. The mechanism consists of a torque tube, such as manufactured by many instrument manufacturers (Foxboro Co., Mercoid Corp., Fisher Governor Co., etc.), and linkages adapted to transfer the motion of rod 110 to stylus 120 through bulkhead 86, and still isolate chambers 80 and 82. The recorder motor 118 may be a standard, chart drive-motor as manufactured by the A. W. Haydon Co., or the R. W. Cramer Co. The chart recording-drum and motor arrangement may be of the types described in United States Patents 1,927,402 by T. R. Harrison, and 1,930,496 by Wilson et al. The valves 104 and 106 may be of a magnetic type as manufactured by Skinner Chuck Co., Asco, Barksdale, etc. These valves may be actuated by a delay switch, not shown, which is of the ordinary type of time-delay and interval switch adapted to make electrical contact at predetermined intervals through a built-in clock mechanism. Such an instrument is obtainable from the Paragon Electrical Company, R. W. Cramer Co., or other manufacturers.

In operation, the device, as shown in FIGURE 1, is set up so that the time-delay switch (not shown) is set to actuate valves 104 and 106 after a predetermined interval. The recorder is lowered into a borehole with ports 96, 98, 100 and 102 open. When the recorder is in the desired position within the borehole, the clock mechanism operates and valves 104 and 106 are closed. This isolates recess 84 under initial borehole pressure. At this time motor 118 is energized, also by the time-delay switch (not shown). Since recess 82 is still open to the borehole pressure, the pressure in zone 82 remains equal to the bottom-hole pressure as it changes with time. Thus, the pressures in zones 84 and 82 become unbalanced and bellows unit 90 moves rod 110 in such a manner as to actuate motion amplifier 112 and move stylus 120 an amount proportional thereto. After the requisite time interval has elapsed, the unit is removed from the borehole, the chart is removed, the changes in pressure noted, and the desired calculations made. The recorded values of the pressure can be directly compared with the static pressure noted in the same environment by the static pressure record on chart 72. In this manner calculations of permeability, initial reservoir pressure, skin effects, and reservoir size can be made with much more accuracy and have more direct significance.

In describing the device of this invention thus far, a static pressure-recorder has been included. However, the differential pressure-recorder of this invention may be used independently of the static pressure-recorder.

Figure 2:
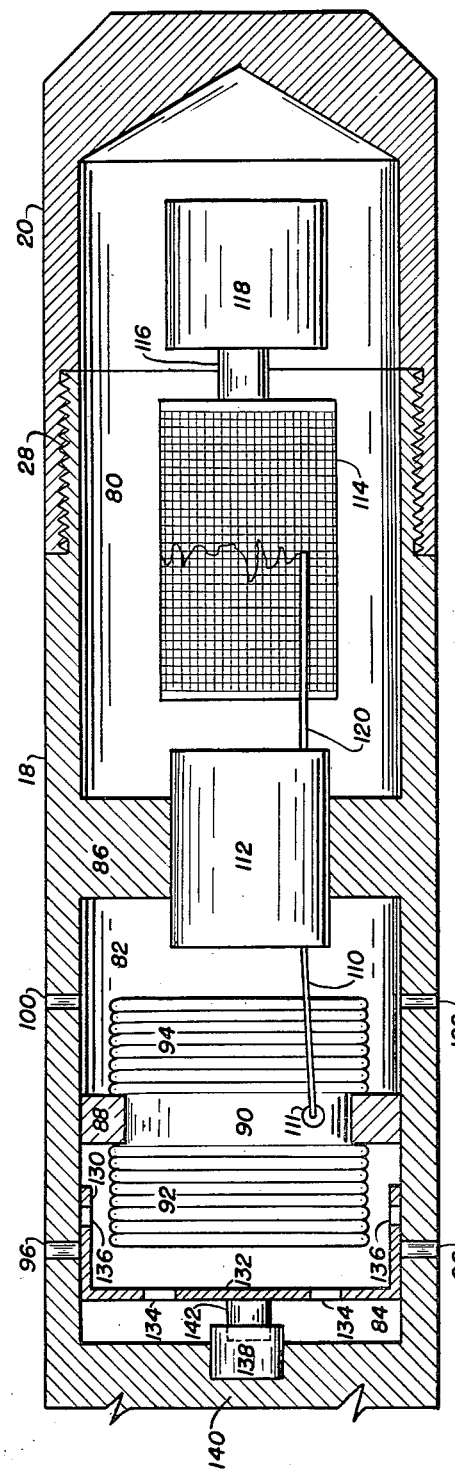
FIGURE 2 is a partial cross-sectional view showing one form of differential valve-port arrangement in conjunction with means responsive to differential pressure, a motion amplifier, and means for recording the sensed differences in pressure.

In FIGURE 2, a more detailed view of a differential pressure-recorder is shown in conjunction with a sleeve valve to operate the differential pressure ports. Corresponding parts from FIGURE 1 bear the same numerical designations. In this embodiment ports 96 and 98 are controlled by a guided sleeve or piston 130 having transverse wall 132 with ports 134 therein. The outer surface of sleeve 130 is in sliding, sealed relationship with the inside surface of section 18. Sleeve 130 has slots or apertures 136 designed to register, in the retracted position of the sleeve, with ports 96 and 98. Sleeve 130 is moved and controlled by solenoid 138 imbedded in transverse wall 140 and connected thereto by means of rod 142.

Solenoid 138 is of a type which has about 100 lbs. of thrust. It causes sleeve 130 to assume one of two positions, one with slots 136 registering with ports 96 and 98 and the other as shown, with recess 84 closed to the outside of section 18. Ports 134 allow sleeve 130 to move through the liquid within recess 84 without encountering resistance due to back pressure. Solenoid 138 is remotely controlled at the surface by means of interconnected wires, current source and switching means, or internally by a clock time-delay mechanism (not shown).

Figure 3:
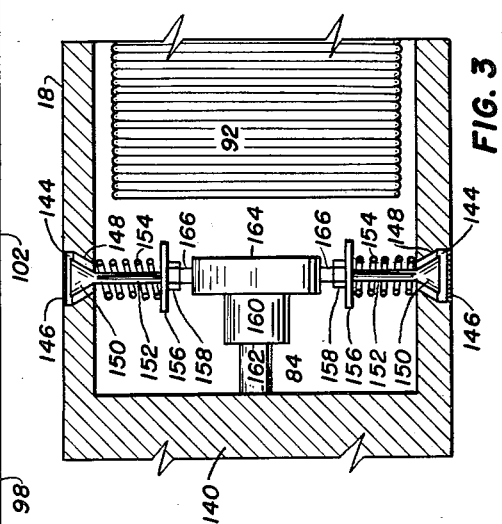
FIGURE 3 is a partial cross-sectional view to show the details of one form of differential valve-port arrangement.

In FIGURE 3 another arrangement for admitting fluid pressure from outside the apparatus into recess 84 is shown. In this embodiment section 18 has ports 144 fitted with screen covers 146, and the inner inside wall of each forms a uniformly conical valve seat 148 against which valves 150 are adapted to seal. Valves 150 are connected to stems 152, and springs 154 held thereon by means of locking devices, in this case washers 156 and nuts 158. The faces of stems 152 and nuts 158 form a sliding surface. Wall 140 supports a self-contained power, control, and motor system 160 by means of bracket 162. Motor 160 drives wheel 164 having cam surfaces 166 which are in contact with stems 152 of valves 150. A time control (not shown) causes motor 160 to run and thereby operate cams 166 which are adapted to open and close the seal between valves 150 and surfaces 148.

Figure 4:
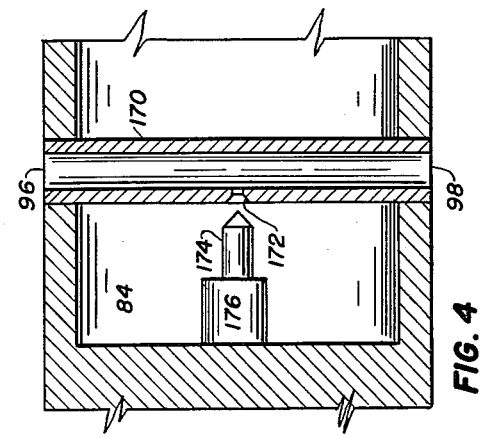
FIGURE 4 is another partial cross-sectional view to show another form of differential valve-port arrangement.

In FIGURE 4 still another embodiment for admitting fluid pressure from outside the apparatus into recess 84 is shown. Here single conduit 170 is connected through wall section 84, and is sealed to the wall section to provide ports 96 and 98. Aperture 172 is provided in conduit 170, and plunger 174 (operated by solenoid 176) is adapted to open and close aperture 172.

In applying the differential pressure device of this invention, both highly compressible fluids (gases) and highly incompressible fluids (liquids) are encountered, and both the compressibility of the fluid and the pressure change must be taken into account in choosing the bellows, ranging from easily flexible to very stiff. A combination of a highly incompressible fluid and a large pressure change could require a highly responsive, flexible bellows because of the small amount it would move, and the sensitivity necessary. Since each combination of fluid compressibility and pressure change has its own individual effect upon the movement of the bellows, it may be necessary to calibrate the differential-pressure readings taken. This can be done by bringing the device out of the bore-hole after a test has been completed and closing chamber 84, thereby entrapping bottom-hole fluid therein. The absolute pressure in the bore-hole may be independently determined by a conventional, bottom-hole, pressure bomb or by the static pressure recorder within housing 14 which has already been described. Following this, with the device at the surface, the open chamber is pressured to a pressure approximating the bottom-hole pressure and the pressure is increased above this value by exact discrete amounts, by units of 5, 50 or 100 lbs., for example, to calibrate the readings on the chart.

What is claimed is:

A differential pressure-recorder for measuring finite pressure changes at high absolute pressures in subterranean formations comprising, in combination, an elongated cylindrical housing member providing a pair of axially aligned longitudinal compartments separated by a transverse wall member, circumferentially aligned ports through said housing and communicating with said compartments, each of said ports associated with one of said compartments having outwardly diverging walls forming a conical valve surface, a spring-tensioned poppet valve having a matching conical surface mounted within each of said ports, said poppet valves having radially aligned stems, cam means in contact with said stems for raising and lowering said poppet valves to open and close same, means for rotating said cam, differential-pressure means having a differential-pressure bellows in pressure-sensing relationship within each compartment, and means for sensing, translating and recording the resultant pressure responses in said open compartment in relation to the static pressure in the poppet-valve-controlled compartment.

References Cited in the file of this patent

UNITED STATES PATENTS

| | | |
|---|---|---|
| 755,175 | Schubert | Mar. 22, 1904 |
| 1,998,996 | Pigott et al. | Apr. 23, 1935 |
| 2,158,569 | Bowen | May 16, 1939 |
| 2,324,785 | Linaker | July 20, 1943 |
| 2,400,048 | Jones | May 7, 1946 |
| 2,496,040 | Criley | Jan. 31, 1950 |
| 2,520,468 | Moore | Aug. 29, 1950 |

FOREIGN PATENTS

| | | |
|---|---|---|
| 248,874 | Germany | July 4, 1912 |